SOLAR CELLS WITH INSULATED WRAPAROUND ELECTRODES

Filed July 5. 1966

INVENTORS
ALFRED E. MANN
EUGENE L. RALPH
BY
Elliott & Pastoriza
ATTORNEYS

United States Patent Office 3,489,615
Patented Jan. 13, 1970

3,489,615

SOLAR CELLS WITH INSULATED WRAPAROUND ELECTRODES

Alfred E. Mann and Eugene L. Ralph, Sylmar, Calif., assignors to Spectrolab, a corporation of California Filed July 5, 1966, Ser. No. 562,791
Int. Cl. H01m *15/02*
U.S. Cl. 136—89 2 Claims

ABSTRACT OF THE DISCLOSURE

A solar cell for use in a solar cell array is provided with a top electrode on its photosensitive surface extending about a side of the solar cell to overlap a second electrode on the bottom surface of the cell. The overlapped portions are held electrically separate by suitable insulating means. By using insulation means, a large bottom electrode may be used to cover a larger area of the bottom surface of the cell thereby decreasing its resistance. Further, freedom in the arrangement of the electrodes on the bottom surface is realized so that flexible interconnecting tabs for an array of cells can all lie in substantially the bottom plane of the cells.

This invention relates broadly to semi-conductor devices and more particularly to a novel electrode configuration on a solar cell for use in solar cell arrays.

In United States Patent Nos. Re. 25,647 and 3,340,096 and in co-pending patent application Ser. No. 450,597, filed Apr. 26, 1965, there are described solar cell arrays with flexible, stress relieved inter-connections enabling the cells to be disposed in a substantially co-planar series-parallel matrix or, alternatively, in a shingled array.

In the co-planar arrays, the desired series connections extend from the top electrode of one cell to the bottom electrode of an adjacent cell and thus a portion of the interconnecting strip must pass between the cells. As a consequence, the ability to pack these cells in a dense array is limited because of the necessity of passing the interconnections between adjacent edges of the cells. Further, the available solar sensitive surfaces are reduced slightly in area because of the eclipsing of a portion of the surface by the interconnecting means electrically connecting to the top electrode on the top surfaces.

The foregoing problem has been overcome by providing wraparound electrodes designed such that the power take-off points may be effected from only one side of the cell thereby eliminating the necessity of passing interconnecting means between adjacent edges so that the cells may be packed more closely together than has heretofore been possible.

However, in the case of a wrapping around of the top electrode to overlap a portion of the bottom surface of the cell to provide both contacts on the bottom surface, there is a serious limitation on the various types of electrode configurations possible. This limitation is a direct consequence of the desirability to have as much of the bottom area in ohmic contact with the bottom or second electrode means as is feasible. Such large contact area is desirable to avoid increasing the series resistance of the cell and avoid decreasing power output. Thus, the overlapping portions of the top electrode have been confined mainly to narrow marginal portions of the bottom surface.

With the foregoing in mind, it is a primary object of the present invention to provide a solar cell in which great freedom in electrode design is made possible and wherein both electrodes on one side of the cell from which power is derived may be made much larger than heretofore possible without the disadvantage of increasing the cell series resistance or decreasing the power output.

Briefly, these and other objects and advantages of this invention are attained by overlapping the two electrodes of a semi-conductor device and maintaining the overlapped portions electrically separated by means of insulation. In the preferred embodiment of a solar cell, a first or top electrode means in ohmic contact with the top solar sensitive surface of the cell is wrapped about one or more edge or edge portions of the cell in such a manner as to overlap a bottom portion of the cell. A second or bottom electrode means in turn is formed on substantially the entire bottom surface of the cell including that which is overlapped by the first electrode means and suitable insulating means is interposed between the overlapping portions so that the first and second electrode means are electrically separated.

With the foregoing arrangement, the various interconnections between cells can be effected as before, by suitable stress relieved type interconnecting means which lie substantially in the plane of the bottom surfaces of the cells so that there is no necessity of any of these interconnections passing between adjacent cells. In addition, there is considerable freedom afforded in the wraparound design since the overlapping portion of the first electrode can be made large without increasing the series resistance of the cell or decreasing its power output.

A better understanding of the invention will be had by now referring to a preferred embodiment thereof as illustrated in the accompanying drawings, in which.

Figures 1, 2:
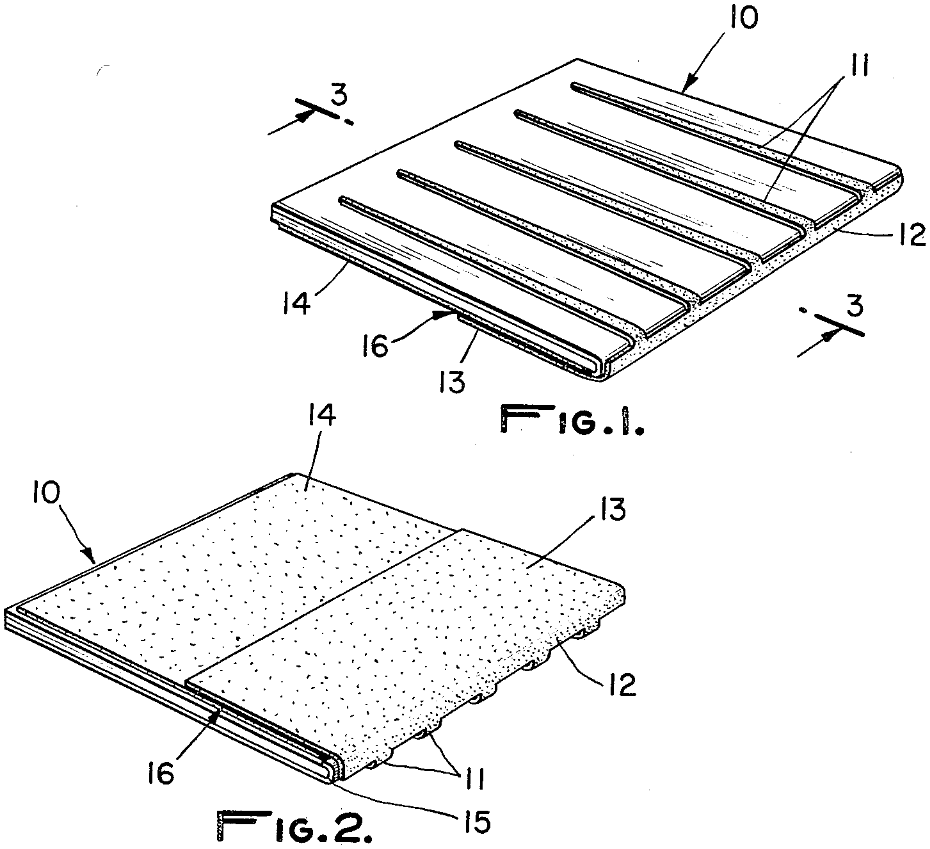
FIGURE 1 is an enlarged perspective view of a solar cell showing the top surface thereof.
FIGURE 2 is a perspective view of the bottom surface of the cell shown in FIGURE 1.

Referring first to FIGURE 1, there is shown a solar cell 10 which may constitute one cell in an array of cells. A first or top electrode means includes a plurality of current pickup paths 11 extending to a side of the cell and merging into a common path 12 along the edge of the cell. This path may extend along the top or bottom marginal surfaces of the edge if desired. As shown, this electrode wraps about the cell to overlap a portion of the bottom of the cell as indicated at 13. Part of a second or bottom electrode means is shown at 14.

Figure 3:
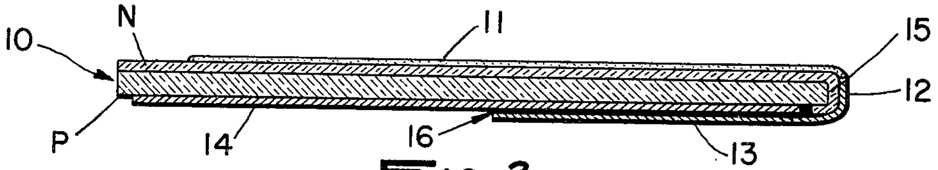
FIGURE 3 is a cross-section in the direction of arrows 3—3 of FIGURE 1.

With reference to FIGURES 2 and 3, it will be seen that the first electrode means 13 overlaps about one-half the second electrode means covering the bottom surface of the cell. This large area of overlap is only set forth as one illustrative electrode configuration wherein a large overlap is provided.

As shown particularly in FIGURE 3, the diffused layer or wafer portion N of the cell 10 may wrap around the edge as at 15. In accord with a feature of the invention, insulation 16 is provided to maintain the overlapping portions of the electrodes 13 and 14 electrically separated from each other. This insulation is important in that it enables substantially the entire surface of the bottom of the cell to be in ohmic contact with the second or bottom electrode means 14.

As mentioned, the degree of wrap-around or overlap of the bottom surface has heretofore been relatively small in order to enable a large percentage of the bottom surface to be in ohmic contact with the bottom or second electrode means. As a consequence, the various types and sizes of electrode configurations that could be used have been limited. On the other hand, overlapping of the bottom surface to any appreciable extent with the second or bottom electrode only covering the remaining portion of the bottom surface can adversely affect the cell performance. This is because the hole-electron pairs which are generated in the region under the wrap-around electrode must diffuse to the P-N junction where they are separated and then the current so generated in this region must travel through the silicon to the electrode, thus introducing a significant series resistance. In other words, the generated current must travel an increased distance through the bulk silicon to reach the bottom electrode.

The series resistance of a solar cell is affected by the base resistivity of the cell. Thus, high base resistivity cells tend to increase this resistance effect. Thus, as mentioned, when an extensive wrap-around area on the bottom surface of the cell is involved, the power loss arising from such series resistance effects can be serious unless the bottom electrode is made to cover substantially all of the bottom surface with the insulation 16 employed to isolate the wrapped-around portion of the first or top electrode.

Figures 4, 5:
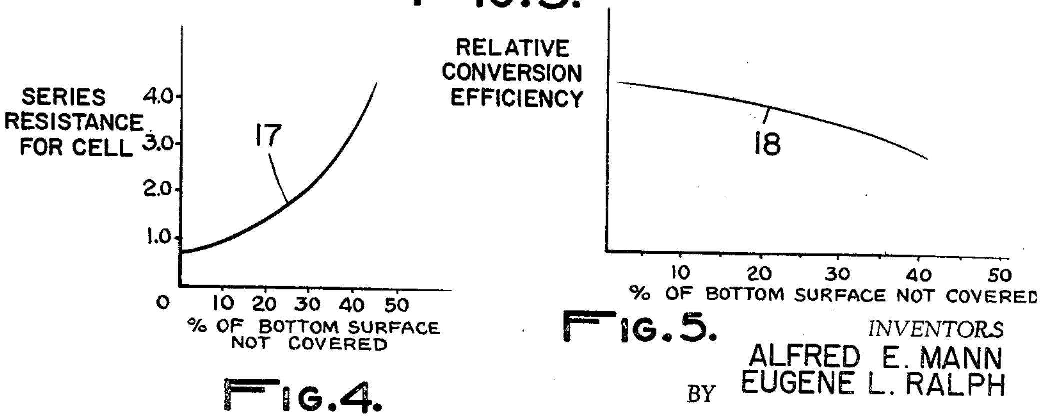
FIGURE 4 is a graph showing the series resistance of a cell as a function of the bottom surface area of the cell not in ohmic contact with a bottom or second electrode means.
FIGURE 5 is another graph illustrating power output of the cell of FIGURE 4 as a function of the bottom surface not in ohmic contact with a second electrode means.

The foregoing will become clear by reference to FIGURE 4 which illustrates the series resistance variation of a silicon solar cell made from a wafer with base resistivity of ten ohm-centimeters as a function of the bottom surface area free of ohmic contact with the second or bottom electrode. It will be noted that the resistance curve 17 slopes up sharply as the percentage of free bottom surface increases.

The effect of the series resistance on the power conversion efficiency of the cell is illustrated in FIGURE 5 wherein it will be noted by the curve 18 that the efficiency drops off as the percentage of bottom cell surface not in ohmic contact with the bottom electrode increases.

The provision of a bottom electrode 14 in ohmic contact with essentially the entire bottom surface of the cell is thus important and by use of the insulation 16 the extent and configuration of the wrap-around or overlapped portion of the first electrode means is not restricted.

The layer of insulating material 16 as shown in FIGURE 3 can be formed by many different processes; for example, it could be formed by evaporating or sputtering various different metallic oxides, minerals, or other dielectric materials. Another technique would be to form the layer by chemical deposition of various materials by chemical decomposition, as for example $SiO_2$ by the thermal decomposition of tetraethyl orthosilicate. Other such chemical means can also be used. A very simple technique would be to spray, dip or otherwise apply an insulating layer such as epoxy or other such coating. Still another technique would be to form the insulating layer by oxidization or anodization of the semiconductive material or the deposited contact. These last techniques are only applicable to some cell designs and materials. In particular, the first of these can be used when the rear silicon surface is especially formed with a high conductivity surface which can then be oxidized by thermal, chemical or electrical means. This silicon oxide surface would be retained as the insulating layer. If the contact material includes aluminum, for example, the rear contact could be oxidized by anodizing to form the insulating layer.

Such insulating material can be deposited as above either before or after formation of the top electrode in the form of the current pickup grids 11 and path 12 but before the formation of the wraparound portion 13 on the bottom and any associated connecting bars or strips on the edges of the cell. Those portions of the wraparound electrode which are in ohmic contact with the top surface and which must be insulated from the bottom surface at the power take-off points, would then be deposited over the insulation and the cell would then be processed in an otherwise normal fashion.

The provision of the insulating material is not only important in enabling a large bottom electrode to be employed to cover a large area of the bottom surface of the cell, but, in addition, any interconnecting means are more easily connected and are more reliable. Moreover, by having the insulating material cover the sensitive junction at the edge of the cell, the danger of damaging and reducing the efficiency of a solar cell in handling, testing, and assembling the cell into arrays is substantially reduced. This latter advantage is further enhanced since it is feasible to apply the insulating material in transparent form over the top of the cell in addition to or as a substitute for the normal anti-reflecting coating or radiation shield filter so that the sensitive semiconducting portion of the device is completely protected by either the insulating material or metal. Such transparent insulating layer deposited on the top surface may also serve as a radiation shield.

In addition, any interconnecting means employed in any series-parallel matrix array of cells will engage the adjacent bottom portions of the respective electrodes and will thus all lie substantially in the plane of the bottom surfaces of the cells without the necessity of any of the connections extending between the cells. Thus, the desired close packing of the cells in a series-parallel matrix array can be realized as before.

It will thus be evident that the present invention has provided an improved solar cell electrode configuration in which the primary object set forth heretofore is fully realized.

While only one embodiment of the invention has been described with respect to an N-P cell with a particular wrap-around configuration, the principles are clearly applicable to P-N type cells and other configurations of wrap-around. The invention, accordingly, is not to be thought of as limited to the particular example set forth merely for illustrative purposes.

What is claimed is:

1. A solar cell having a first electrode means in ohmic contact with one surface of said cell; a second electrode means in ohmic contact with the opposite surface of said cell, said first electrode means extending about an exterior side of said cell to overlie a portion of said second electrode means; and an insulating layer covering the overlapped portion of said second electrode means to insulate said first and second electrode means from each other.

2. A cell according to claim 1, in which said one surface constitutes the photosensitive surface of said cell exposed to solar radiation, said first electrode means including a plurality of current pickup paths extending to said side of said cell and merging into a common path adjacent to the edge of said side to overlie said portion of said second electrode means.

No references cited.

WINSTON A. DOUGLAS, Primary Examiner

M. J. ANDREWS, Assistant Examiner